United States Patent
Wilson et al.

(10) Patent No.: US 10,851,941 B2
(45) Date of Patent: Dec. 1, 2020

(54) LUBRICATION AND SCAVENGE SYSTEM

(71) Applicant: Rolls-Royce Corporation, Indianapolis, IN (US)

(72) Inventors: Eric Wilson, Mooresville, IN (US); John Gebhard, Fishers, IN (US); Josh Gear, Plainfield, IN (US); Mihir Desai, Yorba Linda, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 366 days.

(21) Appl. No.: 15/830,657

(22) Filed: Dec. 4, 2017

(65) Prior Publication Data
US 2019/0170294 A1    Jun. 6, 2019

(51) Int. Cl.
| | |
|---|---|
| *F16N 13/22* | (2006.01) |
| *F16N 7/40* | (2006.01) |
| *F01D 15/12* | (2006.01) |
| *F01D 25/20* | (2006.01) |
| *F16N 31/00* | (2006.01) |
| *F16N 19/00* | (2006.01) |

(52) U.S. Cl.
CPC ............ *F16N 13/22* (2013.01); *F01D 15/12* (2013.01); *F01D 25/20* (2013.01); *F16N 7/40* (2013.01); *F16N 31/00* (2013.01); *F16N 19/00* (2013.01); *F16N 2210/02* (2013.01)

(58) Field of Classification Search
CPC .... F01D 25/20; F01D 25/18; F05D 2260/602; F02C 7/06; F16N 7/40
USPC ....................................................... 184/6.13
See application file for complete search history.

(56) References Cited

U.S. PATENT DOCUMENTS

| | | | | |
|---|---|---|---|---|
| 1,627,750 A | * | 5/1927 | Schmidt .................... | F16N 7/40 |
| | | | | 184/6.13 |
| 2,268,653 A | * | 1/1942 | Flowers ................... | F01M 1/10 |
| | | | | 184/6.21 |
| 2,400,392 A | * | 5/1946 | Davenport ................ | F02C 7/14 |
| | | | | 184/6.13 |

(Continued)

FOREIGN PATENT DOCUMENTS

| | | |
|---|---|---|
| EP | 1389671 A2 | 2/2004 |
| FR | 2358615 A1 | 2/1978 |
| WO | 2015/002577 A1 | 1/2015 |

OTHER PUBLICATIONS

European Patent Office, European Search Report for corresponding EP Application No. 18204794.4 dated Mar. 29, 2019, 9 pgs.

(Continued)

*Primary Examiner* — Henry Y Liu
(74) *Attorney, Agent, or Firm* — Brinks Gilson & Lione

(57) ABSTRACT

A lubrication system comprises a lubricant feed tank, a lubricant feed pump, one or more lubricant nozzles, a scavenge pump drive motor, and one or more scavenge pumps. The lubricant feed pump takes suction from the lubricant feed tank and pumps a lubricant feed as lubricant jets exiting the one or more lubricant nozzles. The lubricant feed pump has a rotating feed pump shaft coupled to a power source. The scavenge pump drive motor drives a rotating scavenge pump shaft that is coupled to the one or more scavenge pumps. The scavenge pumps return lubricant to the lubricant feed tank. The feed pump shaft and scavenge pump shaft rotate independently of each other.

20 Claims, 8 Drawing Sheets

(56) References Cited

U.S. PATENT DOCUMENTS

| | | | | |
|---|---|---|---|---|
| 2,402,467 A * | 6/1946 | Thompson | F01D 25/20 | 184/6.4 |
| 2,464,063 A * | 3/1949 | Streid | F01D 25/20 | 184/6.13 |
| 2,578,275 A * | 12/1951 | Whiteman | F01M 11/067 | 184/6.13 |
| 2,642,155 A * | 6/1953 | Wilhelm, Jr. | F01D 25/20 | 184/6.13 |
| 2,672,010 A * | 3/1954 | Newcomb | F01D 25/20 | 60/39.08 |
| 2,676,458 A * | 4/1954 | Hill | F02C 7/06 | 60/39.08 |
| 2,991,845 A * | 7/1961 | Scheffler, Jr. | F01D 25/20 | 184/6.13 |
| 2,996,146 A * | 8/1961 | Beam, Jr. | F16N 7/40 | 184/6.13 |
| 3,027,971 A * | 4/1962 | Ketler, Jr. | F01D 25/18 | 184/6.13 |
| 4,480,970 A * | 11/1984 | Smith | F04C 15/0053 | 418/15 |
| 4,511,016 A * | 4/1985 | Doell | F16N 7/40 | 184/6.11 |
| 4,976,335 A * | 12/1990 | Cappellato | F16N 7/40 | 184/6.4 |
| 5,004,407 A * | 4/1991 | Hutchison | F01D 25/20 | 184/6.23 |
| 6,996,968 B2 * | 2/2006 | Peters | F01D 25/18 | 60/39.08 |
| 7,699,530 B2 * | 4/2010 | Blais | F01D 25/18 | 184/11.2 |
| 7,717,233 B2 * | 5/2010 | Ashida | F01M 13/04 | 184/6.13 |
| 7,819,227 B2 * | 10/2010 | Rutschmann | F02B 75/243 | 123/196 R |
| 7,871,248 B2 * | 1/2011 | Delaloye | F01D 21/00 | 184/6.11 |
| 8,146,711 B2 * | 4/2012 | Dickie | F16N 39/002 | 184/6.11 |
| 8,210,316 B2 * | 7/2012 | DiBenedetto | F01D 9/065 | 184/6.11 |
| 8,245,818 B2 * | 8/2012 | Alecu | F01D 25/18 | 184/11.2 |
| 8,281,563 B2 * | 10/2012 | Pisseloup | F01D 25/20 | 60/39.08 |
| 8,348,637 B2 * | 1/2013 | Heitzler | F04C 2/084 | 417/410.3 |
| 8,474,259 B2 * | 7/2013 | Kistner | F01M 1/12 | 184/6.11 |
| 8,807,282 B2 * | 8/2014 | Streifinger | F01D 25/18 | 184/104.1 |
| 8,887,869 B2 * | 11/2014 | Pisseloup | B42D 15/00 | 184/6.11 |
| 9,038,779 B2 * | 5/2015 | McCune | F02C 3/107 | 184/6.11 |
| 9,874,145 B2 * | 1/2018 | Teicholz | F02C 7/06 | |
| 2001/0047647 A1 * | 12/2001 | Cornet | F01D 25/20 | 60/772 |
| 2004/0112677 A1 * | 6/2004 | Ito | F16H 57/04 | 184/6.5 |
| 2009/0084104 A1 * | 4/2009 | Roeber | F04C 14/26 | 60/494 |
| 2010/0058729 A1 * | 3/2010 | Fomison | F16N 31/02 | 60/39.08 |
| 2013/0277148 A1 * | 10/2013 | Beck | F16N 29/02 | 184/6.4 |
| 2015/0192074 A1 * | 7/2015 | Eifert | F02C 7/232 | 60/776 |

OTHER PUBLICATIONS

European Office Action, issued in European Application No. 18204794.4, dated Jan. 20, 2020, pp. 1-5, European Patent Office, Munich, Germany.

* cited by examiner

LUBRICATION AND SCAVENGE SYSTEM

FIELD OF THE DISCLOSURE

The present disclosure relates generally to machine components requiring lubrication and cooling, and more specifically to systems and methods of supplying and scavenging lubricant to machine components requiring lubrication and cooling.

BACKGROUND

Many machines have components which require lubrication and cooling. The functions of supplying lubricant to these components and collecting the lubricant after it has lubricated the component are typically performed by a combined lubrication and scavenge system. Collection of lubricant following lubrication of the component allows for recirculation, filtering, and temperature control of the lubricant. Such systems typically draw lubricant from a reservoir and, following lubrication of relevant components of the machine, return the lubricant to the reservoir.

An exemplary lubrication and scavenge system 100 is presented in FIG. 1. System 100 comprises a lubricant pump 102 sharing a common shaft 104 with one or more scavenge pumps 106. Lubricant pump 102 is powered by a machine (not shown) via a gearbox 108. For example, where the machine requiring lubrication is a gas turbine engine the lubricant pump 102 may be coupled via gearbox 108 to a rotating shaft of the engine and thus imparted with motive force.

The lubricant pump 102 takes suction from a lubricant supply tank 110 via suction line 122. Tank 110 contains a lubricant such as oil. Lubricant is pumped via a supply line 120 to various nozzles 112, where it may be sprayed as a lubricant jet 115 onto various components 114 of the machine that require lubrication. Examples of components 114 requiring lubrication include, but are not limited to, gearboxes and bearings. Lubricant is supplied to these components 114, and lubricant then typically flows to a collection area such as a lubricant sump 116. For example, where the machine is a gas turbine engine, lubricant sumps 116 are typically located radially outward from a component 114 such that centrifugal forces move the lubricant from an area housing component 114 to a sump 116.

A scavenge pump 106, which shares a common shaft 104 with lubricant pump 102, takes suction from a sump 116 and discharges lubricant to the tank 110 via return line 120.

Improvements to the lubrication and scavenge systems described above are desired.

SUMMARY

According to some aspects of the present disclosure, a lubrication system comprises a lubricant supply tank, a lubricant feed pump, one or more lubricant jets, a scavenge pump drive motor, and one or more scavenge pumps. The lubricant feed pump has a rotating feed pump shaft, and the lubricant feed pump draws a suction from said lubricant supply tank and discharges a lubricant feed. The one or more lubricant jets receives the lubricant feed and directs the lubricant to one or more components. The scavenge pump drive motor drives a rotating scavenge pump shaft. The one or more scavenge pumps are driven by the scavenge pump shaft, and the scavenge pump shaft rotates independently of the feed pump shaft.

In some embodiments the scavenge pump drive motor is electrically driven. In some embodiments the scavenge pump drive motor is hydraulically driven. In some embodiments the scavenge pump drive motor is hydraulically driven by the lubricant feed.

In some embodiments the pressure of the lubricant feed is greater than 1000 psi. In some embodiments the pressure of the lubricant feed is greater than 2000 psi. In some embodiments the pressure of the lubricant feed is between 2000 psi and 3000 psi.

In some embodiments the lubrication system further comprises a pressure reducing element receiving the lubricant feed and directing the lubricant feed at a reduced pressure to at least one lubricant jet. In some embodiments the pressure of the lubricant feed is greater than 1000 psi and the reduced pressure lubricant feed is less than 500 psi. In some embodiments the pressure of the lubricant feed is between 2000 psi and 3000 psi and the reduced pressure lubricant feed is between 250 and 350 psi.

According to another aspect of the present disclosure, a lubrication system comprises a lubricant supply tank, a lubricant feed pump, a hydraulically-driven scavenge pump drive motor, one or more lubricant jets, and one or more scavenge pumps. The lubricant feed pump has a rotating feed pump shaft, draws suction from said lubricant supply tank, and discharges a lubricant feed. The hydraulically-driven scavenge pump drive motor is driven by said lubricant feed and drives a rotating scavenge pump shaft. The one or more lubricant jets receive the lubricant feed and direct the lubricant to one or more bearing chambers. The one or more scavenge pumps are driven by the scavenge pump shaft and take suction from said one or more bearing chambers.

In some embodiments said lubricant feed pump is driven by a machine via a gearbox. In some embodiments said lubricant feed pump is driven by a motor. In some embodiments said one or more bearing chambers are disposed in a gas turbine engine.

In some embodiments said lubricant feed drives a plurality of hydraulically-driven scavenge pump drive motors arranged in series. In some embodiments the lubricant feed discharged from a first of the plurality of hydraulically-driven scavenge pump drive motors is used to drive a second of the plurality of hydraulically-driven scavenge pump drive motors.

In some embodiments said lubricant feed drives a plurality of hydraulically-driven scavenge pump drive motors arranged in parallel. In some embodiments said lubricant feed pump is driven by a rotating shaft in a gas turbine engine via a gearbox. In some embodiments one of said one or more scavenge pumps has a different pump capacity from another of said one or more scavenge pumps.

According to another aspect of the present disclosure, a method of lubricating a machine comprises rotating a feed pump shaft of a lubricant feed pump to discharge a lubricant feed; directing the lubricant feed to one or more component chambers having a sump; driving a scavenge pump drive motor to rotate a scavenge pump shaft independently of the feed pump shaft; and driving one or more scavenge pumps taking suction from a component chamber sump via the scavenge pump shaft.

In some embodiments said scavenge pump drive motor is hydraulically driven by said lubricant feed. In some embodiments said scavenge pump drive motor is electrically driven.

In some embodiments the step of directing the lubricant feed to one or more component chambers having a sump comprises supplying said lubricant feed to a nozzle to produce a lubricant jet directed into said component chamber. In some embodiments said lubricant feed pump takes suction from a lubricant feed tank and said scavenge pump discharges to said lubricant feed tank.

According to yet another aspect of the present disclosure, a hydraulically-driven motor and pump module for a lubrication system comprises a hydraulically-driven pump drive motor and a pump driven by the rotatable pump drive shaft. The pump drive motor comprises a hydraulic fluid inlet conduit configured to receive a hydraulic fluid, a motor driven by the hydraulic fluid received in the inlet conduit, a rotatable pump drive shaft driven by the motor; and a hydraulic fluid outlet conduit. The pump comprises a suction conduit and a discharge conduit.

In some embodiments the hydraulic fluid is pressurized oil.

In some embodiments the hydraulic fluid outlet conduit is configured to direct hydraulic fluid to one or more lubrication jets. In some embodiments the hydraulic fluid outlet conduit is configured to direct hydraulic fluid to a hydraulic fluid inlet conduit of a second pump drive motor. In some embodiments the hydraulic fluid outlet conduit is configured to direct a portion of the hydraulic fluid to one or more lubrication jets and a portion of the hydraulic fluid to a hydraulic fluid inlet conduit of a second pump drive motor.

In some embodiments the pump takes suction from one or more bearing chambers and discharges to a tank.

In some embodiments the module further comprises a pressure reducing element coupled between the hydraulic fluid inlet conduit and the hydraulic fluid outlet conduit.

BRIEF DESCRIPTION OF THE DRAWINGS

The following will be apparent from elements of the figures, which are provided for illustrative purposes and are not necessarily to scale.

Figure 1:
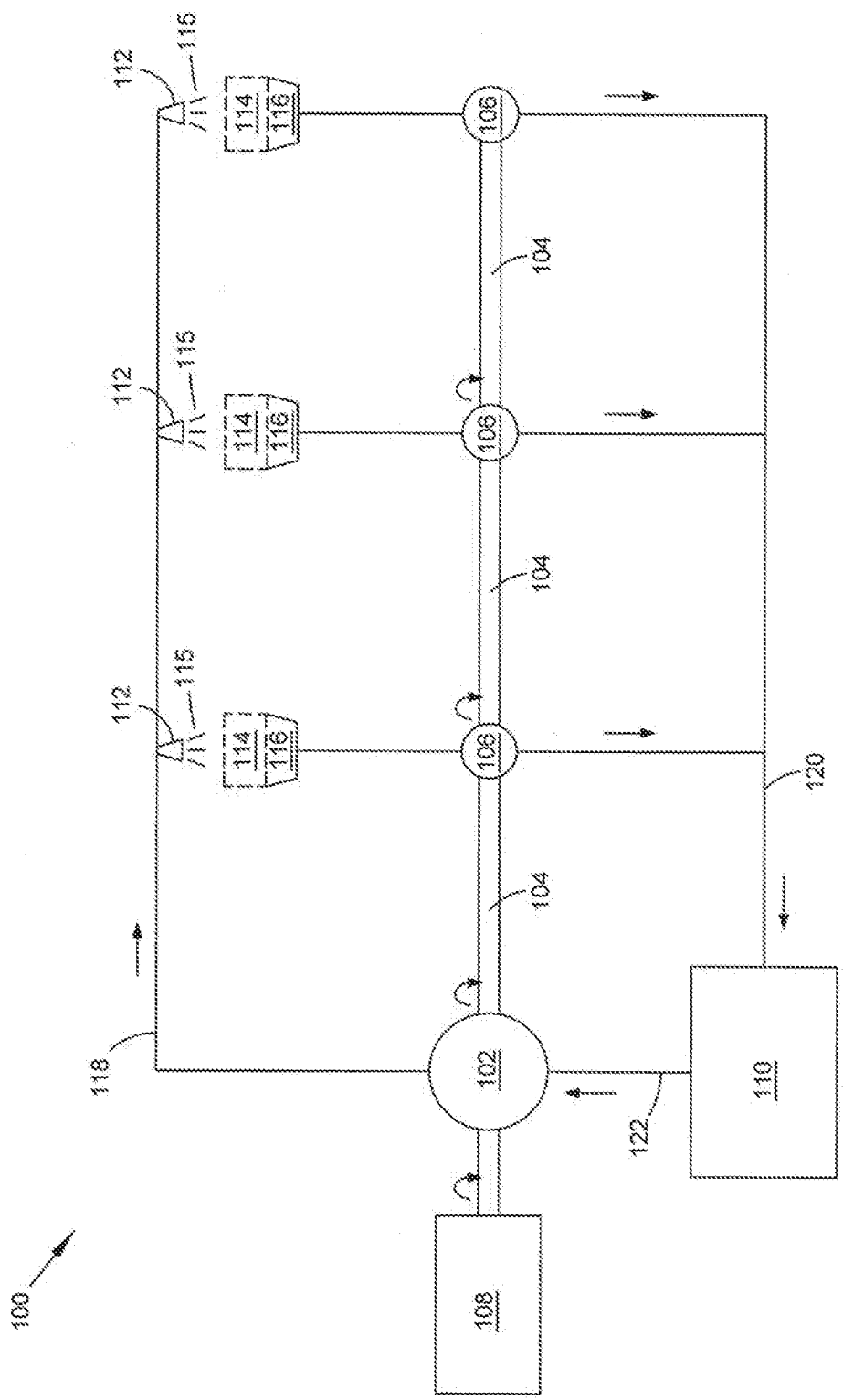
FIG. 1 is a schematic diagram of a typical lubrication and scavenge system.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the disclosure as defined by the appended claims.

DETAILED DESCRIPTION

For the purposes of promoting an understanding of the principles of the disclosure, reference will now be made to a number of illustrative embodiments illustrated in the drawings and specific language will be used to describe the same.

The typical lubrication and scavenge system 100 described above with reference to FIG. 1 suffers from numerous shortcomings. Complex machinery such as a gas turbine engine requires several systems 100 to adequately meet lubrication demand. This adds to the complexity of the overall machine lubrication, since there are multiple gearboxes, lubricant pumps coupled to scavenge pumps, and associated lubricant tubing. The lubricant pump itself is difficult to design, manufacture, and maintain owing to the numerous tubing inlets and outlets in a typical lubricant pump. Further, for system 100 to be effective it generally must be located close to the machine. In embodiments that have space and/or temperature constraints for the system, this further complicates the design and operation.

Figure 2:
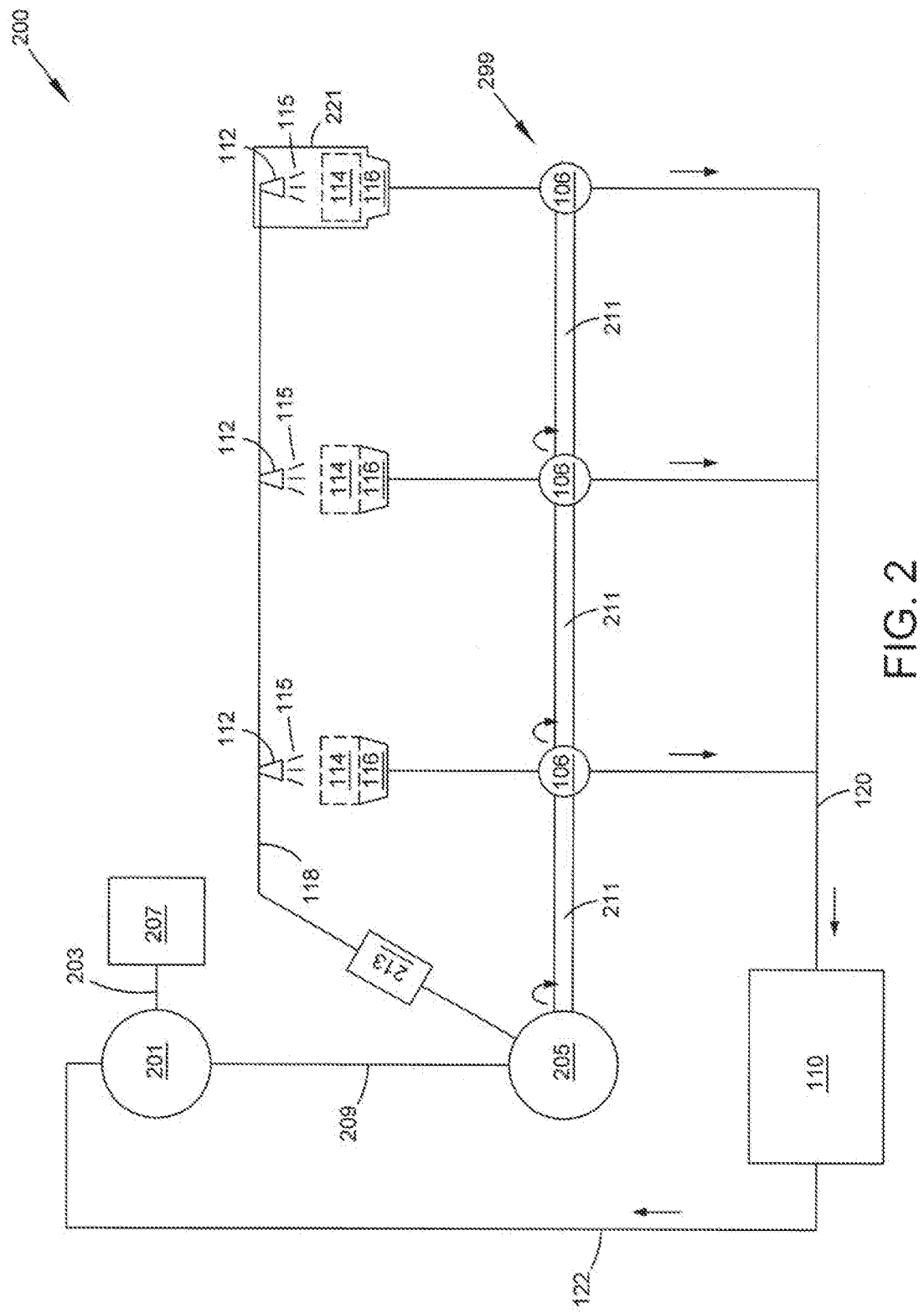
FIG. 2 is a schematic diagram of a lubrication and scavenge system having independently driven lubricant and scavenge pumps in accordance with some embodiments of the present disclosure.

FIG. 2 presents a schematic diagram of an improved lubrication and scavenge system 200 in accordance with some embodiments of the present disclosure. Lubrication and scavenge system 200 may be referred to as lubrication system 200 or system 200. System 200 comprises a lubricant supply tank 110, lubricant feed pump 201, scavenge pump drive motor 205, one or more scavenge pumps 106, and associated pump shafts and tubing (lines) as described below.

Lubricant feed pump 201 takes suction from the lubricant supply tank 110 via suction line 122. Lubricant feed pump 201 has a rotating feed pump shaft 203 coupled to a power source 207 that causes lubricant feed pump 201 to pump lubricant. Power source 207 may be a gearbox coupled to a machine, such as, for example, a rotating machine like a gas turbine engine. Alternatively, power source 207 may be an electrically driven motor that rotates the feed pump shaft 203.

Lubricant feed pump 201 may be a high speed and high pressure pump. In some embodiments, lubricant feed pump 201 discharges lubricant at a lubricant feed pressure of between 2,000 and 3,000 psi. In some embodiments, lubricant feed pump 201 discharges lubricant at a pressure of lubricant feed greater than 2,000 psi. In some embodiments, lubricant feed pump 201 discharges lubricant at a pressure of lubricant feed greater than 1,000 psi.

In some embodiments the discharge of the lubricant feed pump 201 passes through feed line 209 as lubricant feed and drives a hydraulically-driven scavenge pump drive motor 205. The motor 205 is coupled to one or more scavenge pumps 106 by a scavenge pump shaft 211. The scavenge pump shaft 211 rotates independently of the feed pump shaft 203. The one or more scavenge pumps 106 may share a common scavenge pump shaft 211 and thus be considered "ganged." The scavenge pump drive motor 205, scavenge pump shaft 211, and one or more scavenge pumps 106 may be collectively referred to as a scavenge pump balancing unit 229. Each of the one or more scavenge pumps 106 may have a common capacity and/or discharge pressure, or in some embodiments scavenge pumps 106 that are ganged together may have different capacities and/or discharge pressures such that the capacity of a given pump 106 is closely matched to the needed capacity of a related sump 116.

Lubricant feed driving the hydraulically-driven scavenge pump drive motor 205 is reduced in pressure and exits the motor 205 as reduced pressure lubricant feed passing through supply line 118. In some embodiments the pressure reduction through the hydraulically-driven scavenge pump drive motor 205 may be at a ratio of approximately 10:1. In some embodiments the reduced pressure lubricant feed pressure is less than 500 psi. In some embodiments the reduced pressure lubricant feed pressure is between 250 and 350 psi.

The reduced pressure lubricant feed flows from supply line 118 to and through one or more nozzles 112 to create one or more lubricant jets 115. Jets 115 are sprayed onto or otherwise supplied to various components 114 requiring lubrication, such as but not limited to bearings and gearboxes. Once lubricant has lubricated the component 114, it passes to a lubricant sump 116 that may be referred to as a lubricant collection chamber. Lubricant is collected in the sump 116.

In the schematic of FIG. 2, lubricant jets 115, components 114 requiring lubrication, and sumps 116 are shown in a 1:1:1 ratio. However, in some embodiments of the present disclosure there may be additional jets 115 supplied to a single component 114 and sump 116, or additional components 114 sprayed by a single jet 115, or more than one sump 116 for a single jet 115. There may also be a reduced number of sumps 116 such that a single sump 116 collects lubricant from more than one jet 115 and/or more than one component 114. In short, there is no fixed ratio of jets 115, components 114, and sumps 116 required by the present disclosure.

In some embodiments, nozzle 112, lubricant jet 115, component 114, and sump 116 may be collectively disposed within a bearing chamber 221. Sump 116 may be disposed within or may partially define the bearing chamber 221.

One or more scavenge pumps 106 takes suction from the one or more sumps 116. Although FIG. 2 illustrates the scavenge pumps 106 and sumps 116 in a 1:1 ratio, in some embodiments a single pump 106 may take suction from more than one sump 116, or more than one pump 106 may take suction from a single sump 116. Lubricant is pumped from a sump 116 to the lubricant feed tank 110 via a return line 120. In some embodiments return line 120 may include a filter, strainer, deaerator, breather, heat exchanger, or other heat removing device (none shown in FIG. 2).

In some embodiments pressure reducing elements of pressure regulators may be used in the system 200 to ensure lubricant is supplied to components at appropriate pressures. For example, in the system 200 illustrated in FIG. 2, a pressure reducing element 213 is disposed in the supply line 118 between the scavenge pump drive motor 205 and nozzles 112. This pressure reducing element 213 is configured to supply lubricant to the nozzles 112 at a desired pressure that is less than the pressure of the lubricant in the feed line 209.

Figure 6:
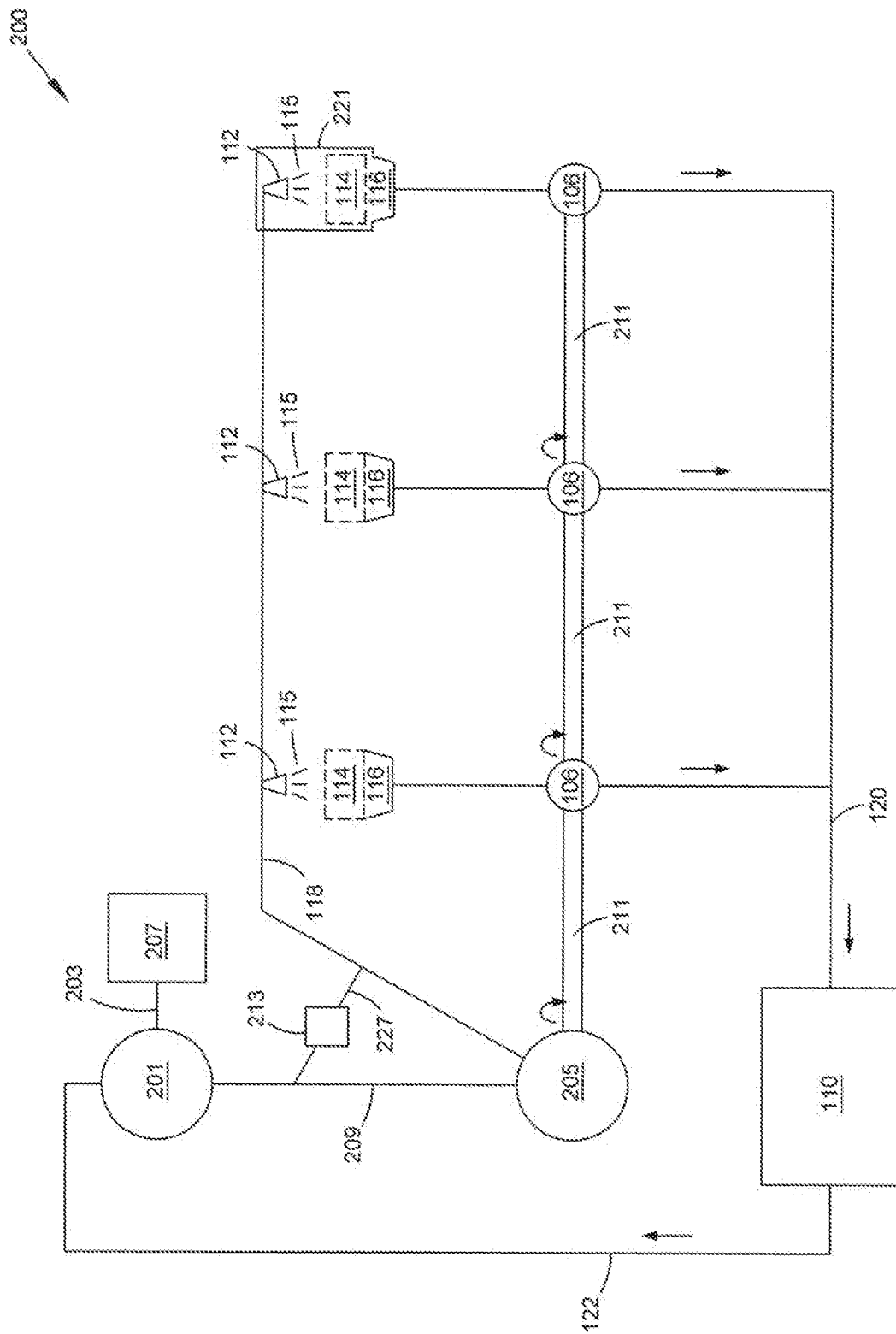
FIG. 6 is a schematic diagram of a lubrication and scavenge system having independently driven lubricant and scavenge pumps in accordance with some embodiments of the present disclosure.

In other embodiments, such as an embodiment of system 200 presented in FIG. 6, a pressure reducing element 213 may instead by used in a bypass line 227 that bypasses the scavenge pump drive motor 205. In embodiments having a hydraulically-driven scavenge pump drive motor 205 a portion of the lubricant feed may be diverted from driving the motor 205 and instead pass through a pressure reducing element 213. Diverting lubricant feed may assist with maintaining reliable lubricant supply pressures and/or regulate the speed of motor 205. Pressure reducing element 213 may be a pressure regulator.

In some embodiments system 200 may comprise a hydraulically-driven scavenge pump drive motor 205 that is driven by a hydraulic fluid that is not lubricant feed.

In other embodiments system 200 may comprise an electrically-driven scavenge pump drive motor 205. In such an embodiment, lubricant feed discharged from the lubricant feed pump 201 may be passed through a pressure reducing element 213 vice passing through the scavenge pump drive motor 205. In other words, the feed line 209 may be coupled to the supply line 118 via the pressure reducing element 213, and the feed line 209 may, in some embodiments, not be coupled to the scavenge pump drive motor 205.

In embodiments having an electrically-driven scavenge pump drive motor 205, one or more scavenge pumps 106 are coupled to the motor 205 via a scavenge pump drive shaft 211. The scavenge pump drive shaft 211 rotates independently of the feed pump shaft 203. The electrically-driven scavenge pump drive motor 205 may be electrically powered from an electrical generator, electric generating machine, or similar device.

In some embodiments the speed of the scavenge pump drive motor 205 is controlled to control the scavenge capacity of the one or more scavenge pumps 106 coupled to the motor 205. Controlling the scavenge capacity may help prevent over-pumping one or more sumps 116 so as to avoid excessive air ingestion into the lubricant. Controlling the scavenge capacity may further help improve overall system efficiency. In some embodiments a controller may control the rotation speed of the scavenge pump shaft 211 to effect changes in scavenge capacity. In embodiments having electrically-driven scavenge pump drive motor 205 a controller may control electrical input to the motor 205 to control speed and thus control scavenge capacity. In embodiments having hydraulically-driven scavenge pump drive motor 205 a controller may control hydraulic input to the motor 205 to control speed and thus control scavenge capacity.

Each of suction line 122, feed line 209, supply line 118, and return line 120 comprises tubing that may be made of stainless steel or similar materials. The tubing may be of a common diameter or may be of varying diameters.

Each of lubricant feed pump 201 and the one or more scavenge pumps 106 may be gerotor, gear, vane (positive displacement), or centrifugal type pumps, or any other pump type effective to pump lubricant.

Figure 4:
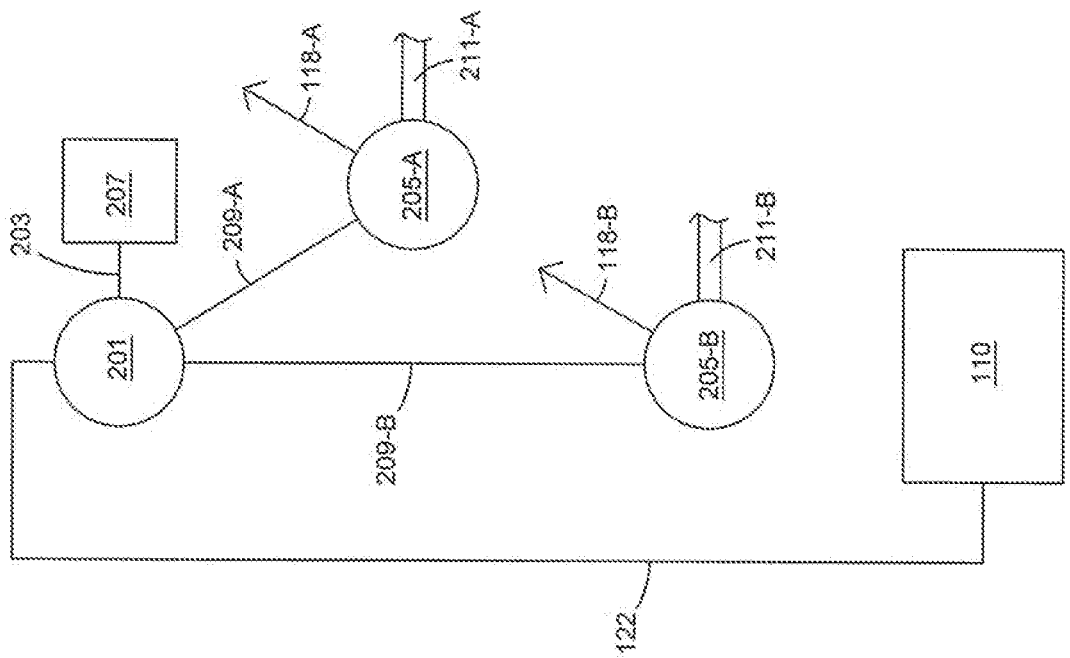
FIG. 4 is a partial schematic diagram of a lubricant feed pump driving a pair of scavenge pump drive motors in parallel, in accordance with some embodiments of the present disclosure.
Figure 3:
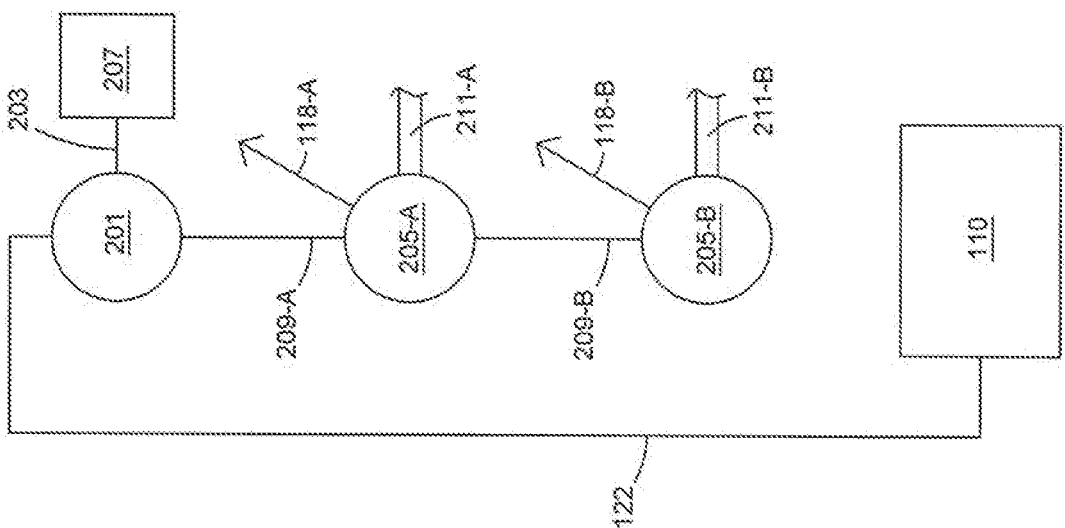
FIG. 3 is a partial schematic diagram of a lubricant feed pump driving a pair of scavenge pump drive motors in series, in accordance with some embodiments of the present disclosure.

According to some embodiments of the present disclosure, a lubricant feed pump 201 may drive more than one hydraulically-driven scavenge pump drive motors 205. The more than one motors 205 may be driven in series or in parallel. FIG. 3 is a partial schematic diagram of a lubricant feed pump 201 driving a pair of scavenge pump drive motors 205-A, 205-B in series, while FIG. 4 is a partial schematic diagram of a lubricant feed pump 201 driving a pair of scavenge pump drive motors 205-A, 205-B in parallel.

As shown in FIG. 3, a lubricant feed pump 201 may discharge a lubricant feed to a first feed line 209-A. The lubricant feed may be used to drive a first scavenge pump drive motor 205-A, and then be split to a first supply line 118-A and a second feed line 209-B. First scavenge pump drive motor 205-A may rotate a first scavenge pump shaft 211-A that is coupled to one or more scavenge pumps (not shown in FIG. 3). Lubricant discharged to the first supply line 118-A may supply one or more nozzles (not shown in FIG. 3).

Lubricant passing through the second feed line 209-B may be used to drive a second scavenge pump drive motor 205-B. The lubricant then passes to a second supply line 118-B and may supply one or more nozzles (not shown in FIG. 3). Second scavenge pump drive motor 205-B may rotate a second scavenge pump shaft 211-B that is coupled to one or more scavenge pumps (not shown in FIG. 3).

Figure 8:
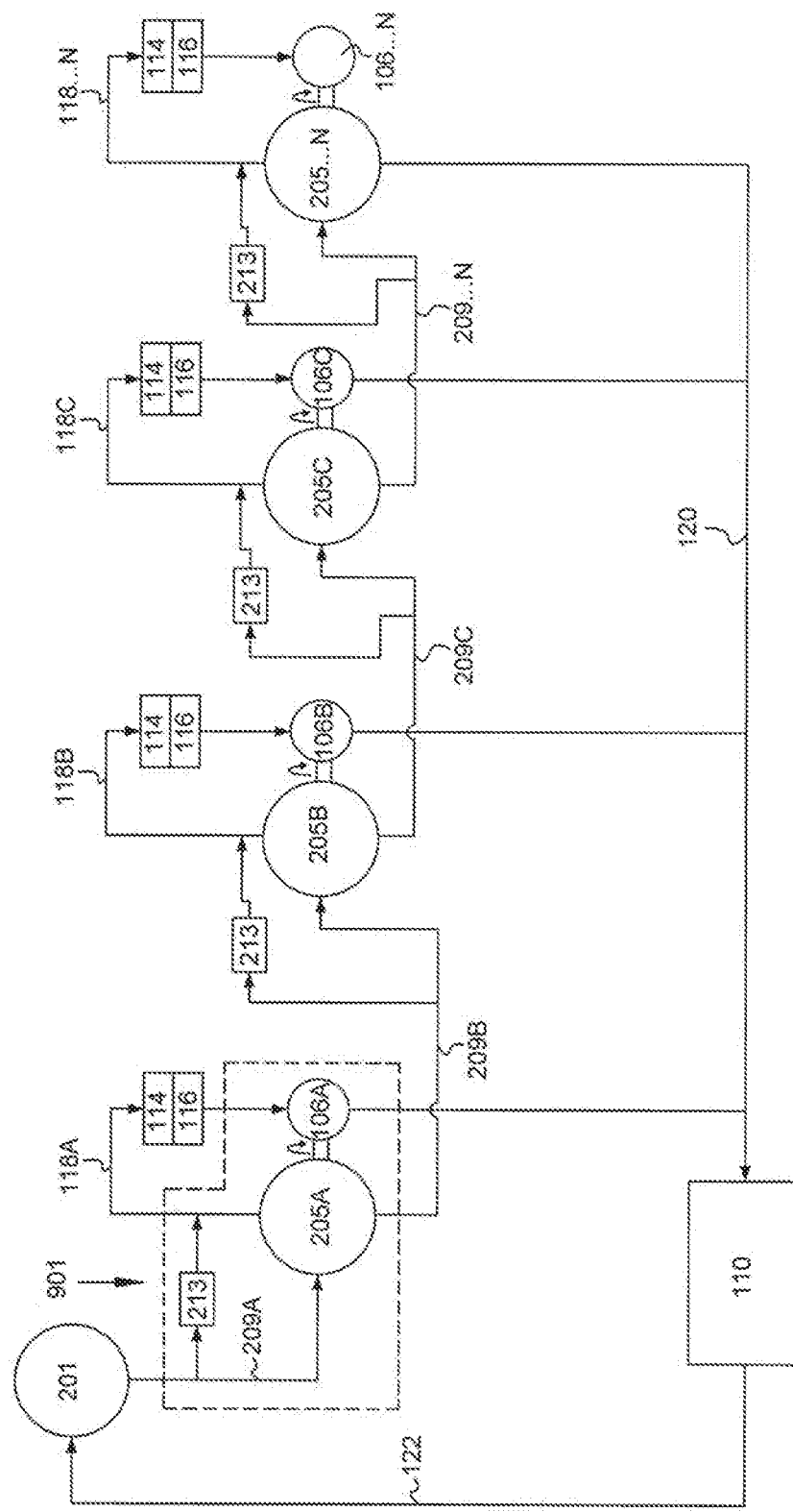
FIG. 8 is a schematic diagram of a lubrication and scavenge system having independently driven lubricant and scavenge pumps in accordance with some embodiments of the present disclosure.

FIG. 8 additionally presents an embodiment of the present disclosure wherein a lubricant feed pump 201 is used to drive one or more scavenge pump drive motors 205 in series. As indicated by scavenge pump drive motor 205 . . . N, the present disclosure contemplates any number of scavenge pump drive motors being driven by lubricant feed discharged from the lubricant feed pump 201.

In the embodiment of FIG. 8, the lubricant feed pump 201 takes suction from lubricant feed tank 110 and discharges a lubricant feed into feed line 209A. The lubricant feed of lubricant feed line 209A drives scavenge pump drive motor 205A. A portion of the lubricant feed discharged from scavenge pump drive motor 205A is directed to a first supply line 118A, and another portion of the lubricant feed may also be directed to a second feed line 209B.

Lubricant feed of second lubricant feed line 209B drives scavenge pump drive motor 205B. A portion of the lubricant feed discharged from scavenge pump drive motor 205B is directed to a second supply line 118B, and another portion of the lubricant feed may also be directed to a third feed line 209C.

Lubricant feed of third lubricant feed line 209C drives scavenge pump drive motor 205C. A portion of the lubricant feed discharged from scavenge pump drive motor 205C is directed to a third supply line 118C, and another portion of the lubricant feed may also be directed to a fourth feed line 209 . . . N.

As indicated by components labeled with " . . . N", lubricant feed may continue to be directed to an additional "N" number of scavenge pump drive motors and supply lines.

Each of the supply lines 118A, 118B, 118C, 118 . . . N may supply one or more components 114 or bearing chambers with lubricant that is then collected in one or more respective sumps 116. Lubricant collected in a sump is returned to the lubricant feed tank 110 by one of scavenge pumps 106A, 106B, 106C, and 106 . . . N.

A bypass line having a pressure reducing element 213 may bypass each of scavenge pump drive motors 205A, 205B, 205C, and 205 . . . N.

In some embodiments the scavenge pump drive motor 205A, scavenge pump 106A, scavenge pump drive shaft 211A, and/or pressure reducing element 213 may be packaged together as a motor and pump module, which is further described with reference to FIG. 9, below. In the illustrated embodiment, a single motor and pump module 901 is indicated.

As shown in FIG. 4, a lubricant feed pump 201 may discharge a lubricant feed to a first feed line 209-A and second feed line 209-B. The lubricant feed may be used to drive a first scavenge pump drive motor 205-A and a second scavenge pump drive motor 205-B in parallel. Lubricant then passes to first supply line 118-A and second supply line 118-B, respectively, where it may supply one or more nozzles (not shown in FIG. 4).

First scavenge pump drive motor 205-A may rotate a first scavenge pump shaft 211-A that is coupled to one or more scavenge pumps (not shown in FIG. 4). Second scavenge pump drive motor 205-B may rotate a second scavenge pump shaft 211-B that is coupled to one or more scavenge pumps (not shown in FIG. 4).

Figure 5:
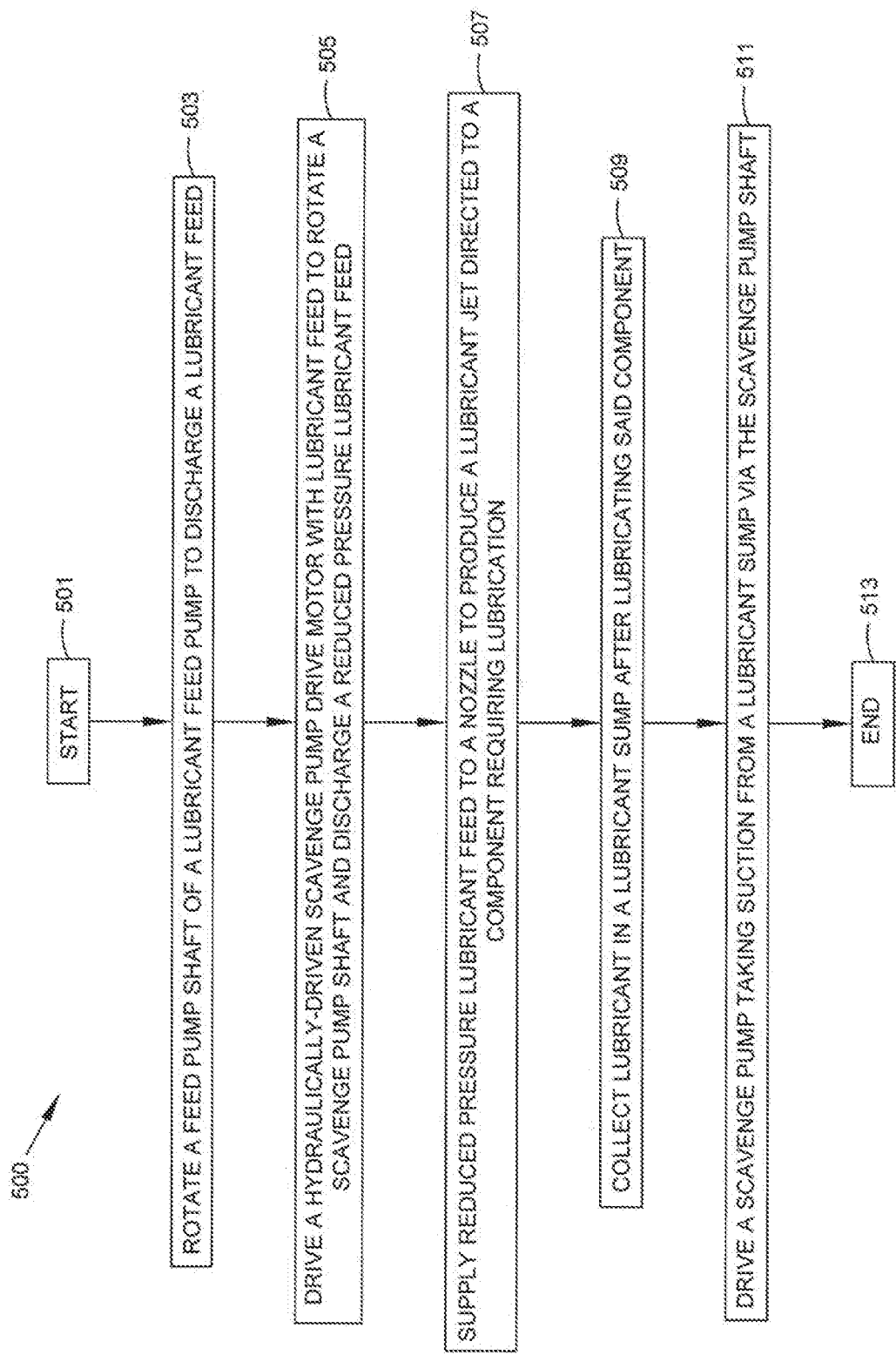
FIG. 5 is a flow diagram of a method of lubricating a machine in accordance with some embodiments of the present disclosure.

The present disclosure further provides a method of lubricating a machine. FIG. 5 is a flow diagram of such a method 500 in accordance with some embodiments of the present disclosure. The method begins at block 501.

At block 503 the feed pump shaft of a lubricant feed pump is rotated to discharge a lubricant feed. The lubricant feed pump may take suction from a lubricant feed tank. The feed pump shaft may be coupled to a power source, that may be either a machine coupled via a gearbox, or an electrical power supply. The lubricant feed pump may be gerotor, gear, vane (positive displacement), or centrifugal type pump, or any other pump type effective to pump lubricant.

At block 505 the lubricant feed is used to drive a hydraulically driven scavenge pump drive motor. Driving the motor causes rotation of a scavenge pump shaft that is coupled to one or more scavenge pumps. After driving the motor, lubricant feed is discharged as a reduced pressure lubricant feed. In some embodiments a controller may control the speed of the scavenge pump drive motor and/or scavenge pump shaft to control scavenge pumping capacity.

The reduced pressure lubricant feed is supplied to a nozzle to produce a lubricant jet at block 507. The lubricant jet is directed to a component requiring lubrication, which may be disposed within a bearing chamber.

At block 509 lubricant is collected in a lubricant sump after lubricating the component. The lubricant sump may be disposed within or may partially define a bearing chamber.

At block 511 a scavenge pump is driven from the scavenge pump shaft and takes suction from a lubricant sump. The scavenge pump may discharge lubricant to a lubricant feed tank via a return line. In some embodiments the return line may include a filter, strainer, deaerator, breather, heat exchanger, or other heat removing device.

The method 500 ends at block 513.

Figure 7:
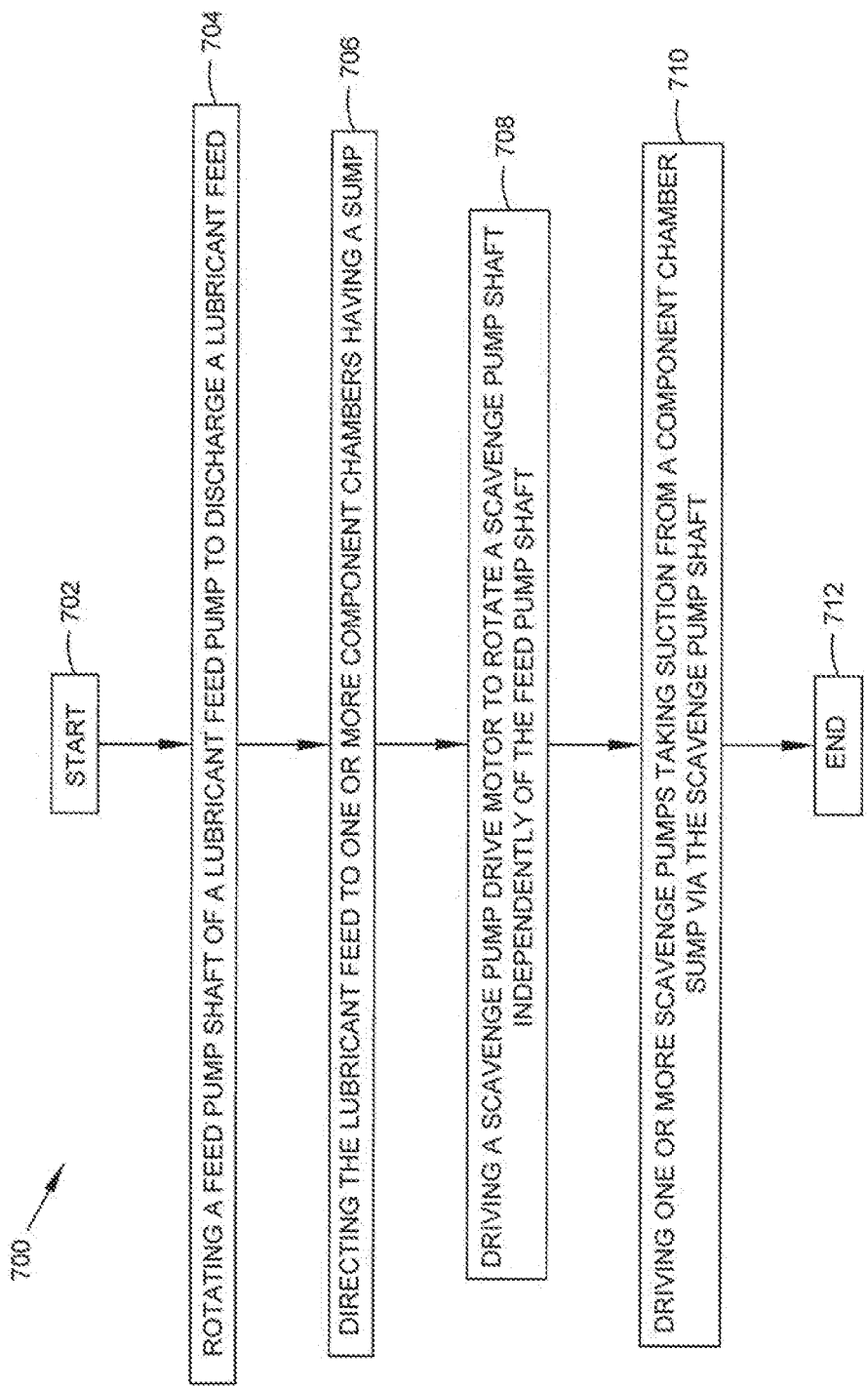
FIG. 7 is a flow diagram of a method of lubricating a machine in accordance with some embodiments of the present disclosure.

The present disclosure provides another method of lubricating a machine. FIG. 7 is a flow diagram of such a method 700 in accordance with some embodiments of the present disclosure. The method begins at block 702.

At block 704 the feed pump shaft of a lubricant feed pump is rotated to discharge a lubricant feed. The lubricant feed pump may take suction from a lubricant feed tank. The feed pump shaft may be coupled to a power source, that may be either a machine coupled via a gearbox, or an electrical power supply. The lubricant feed pump may be gerotor, gear, vane (positive displacement), or centrifugal type pump.

At block 706 the lubricant feed is directed to one or more components requiring lubrication and/or component chambers having a sump. The lubricant feed may be directed using one or more nozzles that creates one or more lubricant jets for applying lubricant to a component requiring lubrication and/or component chambers having a sump. The component requiring lubrication may be a component that requires lubrication, cooling, or both. The component requiring lubrication may be disposed in a component chamber. The lubricant feed may pass through a pressure reducing element or pressure regulator prior to being directed to one or more components requiring lubrication and/or component chambers having a sump.

A scavenge pump drive motor is driven at block 708. Driving the scavenge pump drive motor causes rotation of a scavenge pump shaft coupled between the scavenge pump drive motor and one or more scavenge pumps. The scavenge pump shaft rotates independently of the feed pump shaft. In some embodiments a controller may control the speed of the scavenge pump drive motor and/or scavenge pump shaft to control scavenge pumping capacity.

In some embodiments the lubricant feed is used to drive a hydraulically driven scavenge pump drive motor. The lubricant feed may then be directed as a reduced pressure lubricant feed to additional hydraulically driven components, to one or more components requiring lubrication, to one or more component chambers having a sump, and/or to a lubricant feed tank. In other embodiments the scavenge pump drive motor is electrically driven.

At block 710 one or more scavenge pumps are driven by the scavenge pump shaft and take suction from a component chamber sump. The sump may be disposed within or may partially define a bearing chamber. The scavenge pump may discharge lubricant to a lubricant feed tank via a return line. In some embodiments the return line may include a filter, strainer, deaerator, breather, heat exchanger, or other heat removing device.

The method 700 ends at block 712.

In any of the embodiments described above, a scavenge pump drive motor, scavenge pump, scavenge pump drive shaft, and/or pressure reducing element 213 may be packaged together as a motor and pump module. Packaging a scavenge pump drive motor and scavenge pump together in this fashion may be advantageous by avoiding the use of external scavenge pump shafts (i.e. the shaft connecting the scavenge pump drive motor and the scavenge pump may be internal to the packaged motor and pump module). A description of one such embodiment of a motor and pump module is provided below with reference to FIG. 9.

Figure 9:
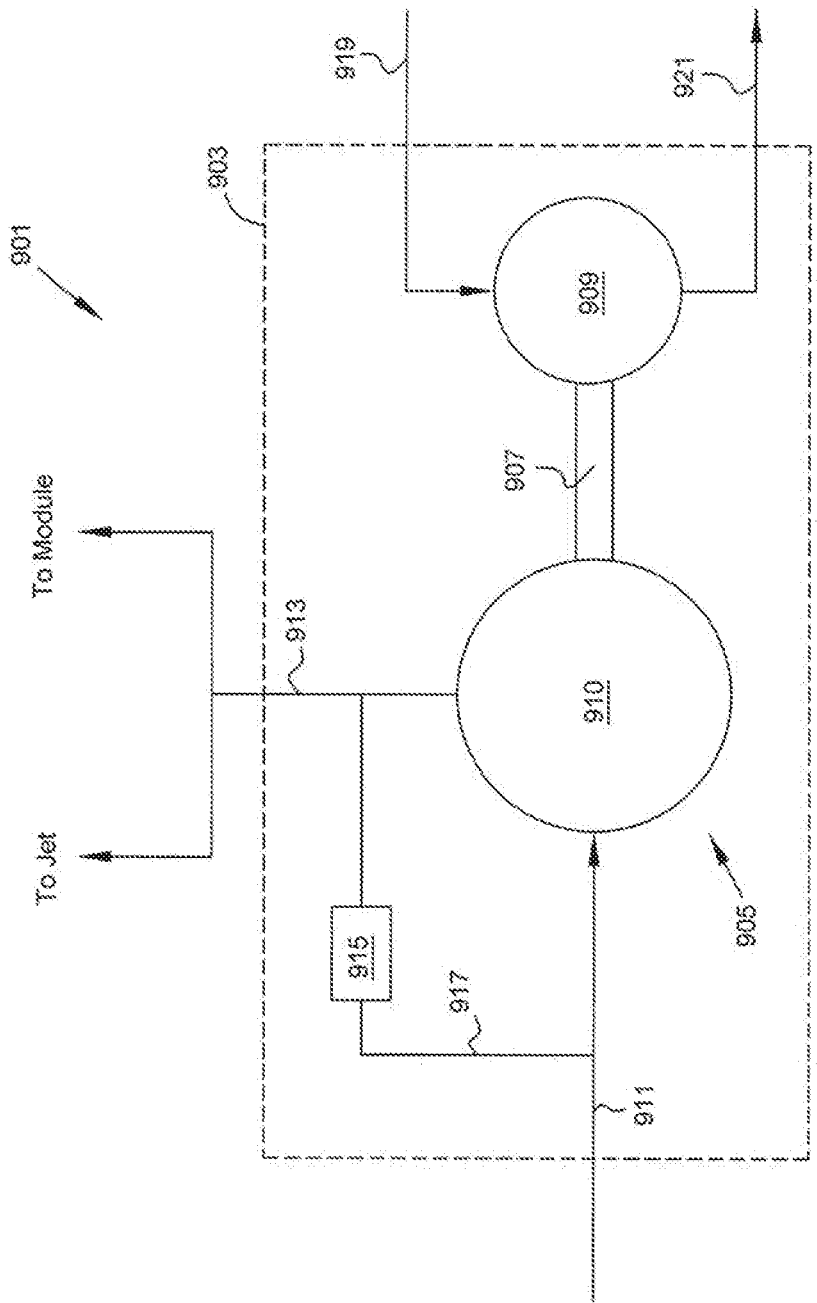
FIG. 9 is a schematic diagram of a hydraulically-driven motor and pump module for a lubrication system, in accordance with some embodiments of the present disclosure.

FIG. 9 presents a schematic diagram of a hydraulically-driven motor and pump module 901 for a lubrication system. The module 901 comprises a hydraulically-driven pump drive motor 905, a rotatable pump drive shaft 907, and a pump 909. The hydraulically-driven pump drive motor 905 may further comprise a motor 910, a hydraulic fluid inlet conduit 911, and a hydraulic fluid outlet conduit 913. The module 901 may be disposed in a housing 903.

The motor 910 is driven by the hydraulic fluid received in the hydraulic fluid inlet conduit 911. The hydraulic fluid may be pressurized oil or lubricant. After driving the hydraulically-driven pump drive motor 905, the hydraulic fluid exits the module 901 via the hydraulic fluid outlet conduit 913.

The motor 910 may be coupled to the pump 909 via the rotatable pump drive shaft 907. The motor 910 may drive the pump drive shaft 907, and the pump drive shaft 907 may drive the pump 909. The pump 909 may comprise a suction conduit 919 and a discharge conduit 921.

In some embodiments the hydraulic fluid outlet conduit 913 may direct hydraulic fluid to one or more nozzles and/or lubricant jets (not shown) after the hydraulic fluid has driven the motor 910. In some embodiments the hydraulic fluid outlet conduit 913 may direct hydraulic fluid to a second motor and pump module (not shown) after the hydraulic fluid has driven the motor 910. In some embodiments, the hydraulic fluid outlet conduit 913 may direct a portion of the hydraulic fluid to one or more nozzles and/or lubricant jets (not shown) and a portion of the hydraulic fluid to a second motor and pump module (not shown) after the hydraulic fluid has driven the motor 910. The module 901 may comprise more than one hydraulic fluid outlet conduit 913 to direct hydraulic fluid to multiple destinations.

In some embodiments the module 901 may further comprise a pressure reducing element 915 coupled between the hydraulic fluid inlet conduit 911 and the hydraulic fluid outlet conduit 913 via a bypass conduit 917. The pressure reducing element 915 may be pressure reducing element 213 described above.

The module 901 may be disposed in a lubrication and scavenge system as described above. The pump 909 may be a scavenge pump. The pump 909 may take suction from a sump or bearing chamber via the suction conduit 919. The pump 909 may discharge to a feed tank or similar vessel via the discharge conduit 921.

The present disclosure provides numerous advantages over prior art lubrication and scavenge systems and methods. The multiple, distributed systems described in FIG. 1 may now be consolidated and centralized through the use of a high speed, high pressure lubricant feed pump. This simplification of overall machine lubrication results in the elimination of several gearboxes, lubricant pumps, and associated lubricant tubing. In some embodiments the result is a substantial size and weight savings as compared to prior art designs.

The lubricant feed pump may be moved further from the components requiring lubrication, which may ease space and/or temperature constraints on the system. For example, in a gas turbine engine application for an aircraft, the lubricant feed pump may now be moved to the nacelle instead of being disposed proximate the engine. The lubricant feed pump may also be removed from zones of the engine with the highest temperatures and/or the greatest risk of fire. Further, low temperature elements of the system can be moved away from the engine core, for example near to the lubricant feed tank, which may, for some elements, reduce maintenance costs and improve reliability.

By increasing the discharge pressure of the lubricant feed pump over prior art designs a single lubricant feed pump can be used to drive multiple scavenge balancing units, and can even be used to drive scavenge balancing units on multiple engines. For example, in an aircraft application having two gas turbine engines mounted to a single wing the present invention would allow for a common lubrication and scavenge system as disclosed herein to be used with both engines.

Further, the lubricant feed pump may be simplified over prior designs by reducing the lubricant tubing inlets and outlets.

Finally, the scavenge capacity may be customized, optimized, or balanced for various scavenge locations through the use of additional scavenge pumps and/or varying the speed of the scavenge pump drive motor. This assists with efficient and non-air-ingesting transfer of lubricant from a sump to a lubricant feed tank.

The present application discloses one or more of the features recited in the appended claims and/or the following features which, alone or in any combination, may comprise patentable subject matter.

Although examples are illustrated and described herein, embodiments are nevertheless not limited to the details shown, since various modifications and structural changes may be made therein by those of ordinary skill within the scope and range of equivalents of the claims.

What is claimed is:
1. A lubrication system comprising:
a lubricant supply tank;
a lubricant feed pump having a rotatable feed pump shaft, said lubricant feed pump configured to draw a lubricant from said lubricant supply tank and discharge a lubricant feed;

one or more lubricant jets configured to direct the lubricant from the lubricant feed to one or more components;

one or more scavenge pump drive motors configured to drive a rotatable scavenge pump shaft; and one or more scavenge pumps, the scavenge pump shaft configured to drive the one or more scavenge pumps;

wherein the scavenge pump shaft is configured to rotate independently of the feed pump shaft, wherein the lubricant feed pump is configured to drive a first scavenge pump drive motor and a second scavenge pump drive motor included in the one or more scavenge pump drive motors.

2. The lubrication system of claim 1 wherein the one or more scavenge pump drive motors are configured to be electrically driven.

3. The lubrication system of claim 1 wherein the one or more scavenge pump drive motors are configured to be hydraulically driven.

4. The lubrication system of claim 3 wherein the one or more scavenge pump drive motors are configured to be hydraulically driven by the lubricant feed.

5. The lubrication system of claim 4 wherein a pressure of the lubricant feed is greater than 1000 psi.

6. The lubrication system of claim 4 wherein a pressure of the lubricant feed is between 2000 psi and 3000 psi.

7. The lubrication system of claim 1 further comprising a pressure reducing element configured to direct the lubricant feed at a reduced pressure to at least one lubricant jet.

8. The lubrication system of claim 7 wherein a pressure of the lubricant feed is greater than 1000 psi and the reduced pressure lubricant feed is less than 500 psi.

9. The lubrication system of claim 4 wherein a pressure of the lubricant feed is between 2000 psi and 3000 psi and the reduced pressure lubricant feed is between 250 and 350 psi.

10. The lubrication system of claim 1 wherein the components comprise a sump.

11. The lubrication system of claim 1 wherein the lubrication system further comprises a nozzle configured to direct the lubricant feed to the one or more components.

12. A lubrication system comprising:

a lubricant supply tank;

a lubricant feed pump having a rotatable feed pump shaft, said lubricant feed pump configured to draw a lubricant from said lubricant supply tank and discharge a lubricant feed;

one or more hydraulically-driven scavenge pump drive motors configured to be driven by said lubricant feed and configured to drive a rotatable scavenge pump shaft;

one or more lubricant jets configured to direct the lubricant feed to one or more bearing chambers;

and one or more scavenge pumps, the scavenge pump shaft configured to drive the one or more scavenge pumps, wherein the one or more scavenge pumps are configured to take suction from said one or more bearing chambers;

wherein the lubricant feed pump is configured to drive a first scavenge pump drive motor and a second scavenge pump drive motor included in the one or more scavenge pump drive motors.

13. The lubrication system of claim 12 wherein said lubricant feed pump is configured to be driven by a machine via a gearbox.

14. The lubrication system of claim 12 wherein said lubricant feed pump is configured to be driven by a motor.

15. The lubrication system of claim 12 wherein said one or more bearing chambers are disposed in a gas turbine engine.

16. The lubrication system of claim 12 wherein the first scavenge pump drive motor and the second scavenge pump drive motor are arranged in series along the lubricant feed.

17. The lubrication system of claim 12 wherein the lubricant feed discharged from the first scavenge pump drive motor is used to drive the second scavenge pump drive motor.

18. The lubrication system of claim 12 wherein the first scavenge pump drive motor and the second scavenge pump drive motor are arranged in parallel.

19. The lubrication system of claim 12 wherein said lubricant feed pump is configured to be driven by a rotating shaft in a gas turbine engine via a gearbox.

20. A lubrication system comprising:

a lubricant supply tank;

a lubricant feed pump having a rotatable feed pump shaft, said lubricant feed pump configured to draw a lubricant from said lubricant supply tank and discharge a lubricant feed;

a plurality of hydraulically-driven scavenge pump drive motors configured to be driven by said lubricant feed and configured to drive a rotatable scavenge pump shaft;

one or more lubricant jets configured to direct the lubricant feed to one or more bearing chambers;

and one or more scavenge pumps, the scavenge pump shaft configured to drive the one or more scavenge pumps, wherein the one or more scavenge pumps are configured to take suction from said one or more bearing chambers, wherein the lubricant feed discharged from a first of said plurality of hydraulically-driven scavenge pump drive motors is used to drive a second of said plurality of hydraulically-driven scavenge pump drive motors.

* * * * *